(12) United States Patent
van de Burgt et al.

(10) Patent No.: US 10,627,853 B2
(45) Date of Patent: Apr. 21, 2020

(54) CLOCK TUNING

(71) Applicant: NXP B.V., Eindhoven (NL)

(72) Inventors: Rolf van de Burgt, Oosterbeek (NL); Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 86 days.

(21) Appl. No.: 15/901,597

(22) Filed: Feb. 21, 2018

(65) Prior Publication Data

US 2019/0258288 A1 Aug. 22, 2019

(51) Int. Cl.
| | |
|---|---|
| *G06F 1/12* | (2006.01) |
| *G06F 13/26* | (2006.01) |
| *G06F 13/42* | (2006.01) |
| *G06F 21/44* | (2013.01) |
| *G06F 21/85* | (2013.01) |
| *G06F 13/36* | (2006.01) |
| *H04L 29/06* | (2006.01) |

(52) U.S. Cl.
CPC ................ *G06F 1/12* (2013.01); *G06F 13/36* (2013.01); *G06F 13/4295* (2013.01); *G06F 21/44* (2013.01); *G06F 21/85* (2013.01); *H04L 63/123* (2013.01); *H04L 63/126* (2013.01)

(58) Field of Classification Search
CPC ........ G06F 1/12; G06F 13/36; G06F 13/4295; G06F 21/44; G06F 21/85; H04L 63/123; H04L 63/126
See application file for complete search history.

(56) References Cited

U.S. PATENT DOCUMENTS

| | | | |
|---|---|---|---|
| 7,929,483 B2 * | 4/2011 | Kimball .................. | G06F 21/10 370/324 |
| 8,566,632 B2 | 10/2013 | van de Burgt et al. | |
| 9,438,422 B2 * | 9/2016 | Gutierrez .................. | H04L 9/12 |
| 2012/0093268 A1 | 4/2012 | Elend | |
| 2015/0089236 A1 | 3/2015 | Han et al. | |
| 2015/0295700 A1 | 10/2015 | Gomez Gutierrez et al. | |

* cited by examiner

*Primary Examiner* — Stefan Stoynov
(74) *Attorney, Agent, or Firm* — Rajeev Madnawat

(57) ABSTRACT

Aspects of the present disclosure involving tuning clock signal sources for communication. As may be implemented in accordance with one or more embodiments, trustworthiness of a message or a source of the message is validated, as indicated by data received over a data bus that communicatively couples a plurality of circuits respectively including an independent clock signal source. Data sent between the circuits can be received by adaptively sampling data that is carried by the data bus. Timing information is calculated relative to data frames of the data received over the data bus, and a clock signal source at one of the circuits is tuned in response to the validating and the calculating.

19 Claims, 4 Drawing Sheets

CLOCK TUNING

BACKGROUND

Various communication protocols using distributed clock synchronization allow multiple master devices and slave devices to communicate over a bus in a communication network without a clock signal. An internal clock base for the devices is extracted from the incoming data. As a result, internal clocks in the devices are desirably within a certain tolerance, relative to one another, in order to correctly communicate over the bus. Crystal oscillators or on-chip oscillators may be used for clocking. In many implementations, a network may include transceivers and small slave devices that need to be able to decode messages sent on the bus and then perform actions, such as for waking up other devices. These devices may benefit from low cost characteristics, and from low power consumption.

Microcontrollers are found in a wide variety of products, such as electronic consumer devices and household appliances. A microcontroller should be clocked by a stable and accurate oscillating signal. Various applications involve communications in systems in which a controller provides communication to various nodes in the system for establishing a clock signal. One such application is in a CAN (controller area network) system, which can be used in automotive applications. Many CAN controllers require that the clock frequency does not deviate more than a fixed percentage from a nominal frequency. However, utilizing an external clock source for all nodes on such a network can be cost-prohibitive. Moreover, such networks may be susceptible to attack, and under which conditions, synchronizing to a central clock source may be undesirable.

These and other matters have presented challenges to communications, for a variety of applications.

SUMMARY

Various example embodiments are directed to clock tuning, such as may be implemented for synchronizing clocks utilized by respective nodes that communicate with one another over a network.

Aspects of the present disclosure involving tuning clock signal sources for communication. As may be implemented in accordance with one or more embodiments, trustworthiness of a message or a source of the message is validated, as indicated by data received over a data bus that communicatively couples a plurality of circuits respectively, including an independent clock signal source. Data sent between the circuits can be received by adaptively sampling data that is carried by the data bus. Timing information is calculated relative to data frames of the data received over the data bus, and a clock signal source at one of the circuits is tuned in response to the validating and the calculating.

As may be implemented in accordance with one or more embodiments, an apparatus includes a receiver circuit configured and arranged to receive data messages, a clock signal generator circuit, and logic circuitry configured and arranged to tune the clock signal generator circuit for synchronization with remote transmitter circuits that transmit the data messages. The tuning is carried out as follows. Trustworthiness of one of the received data messages is assessed, and in response to the assessing indicating that the one of the received data messages is trustworthy, the clock signal generator circuit is tuned based on information in the one of the received data messages.

Other aspects of the disclosure are directed to a circuit-based apparatus having a first circuit and a plurality of other circuits, a data bus, and logic circuitry that tunes a clock signal source of the first circuit. Each respective circuit includes an independent clock signal source (e.g., for asynchronous communications). The data bus is configured and arranged to communicatively couple the first circuit and each of the plurality of other circuits so that data sent between the circuits can be received by adaptively sampling data that is carried by the data bus. The logic circuitry is configured and arranged with the first circuit to tune the first clock signal source by validating trustworthiness of a message or a message source as indicated by data received over the data bus, calculating timing information relative to data frames of the data received over the data bus, and tuning the first clock signal source in response to the validating and the calculating. As such, the first clock signal source can be tuned to a clock of one of the plurality of other circuits, which is otherwise asynchronous.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
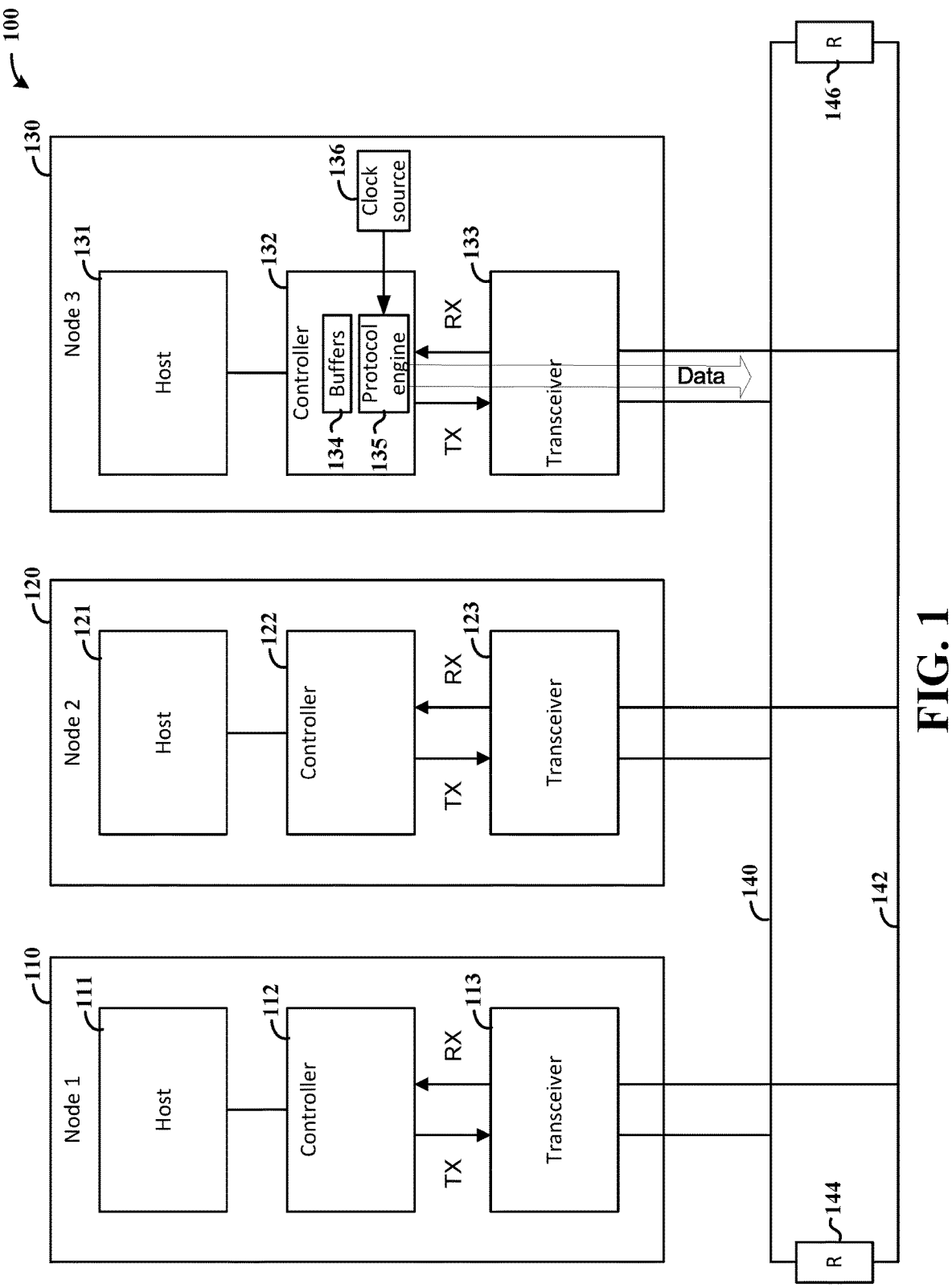
FIG. 1 depicts an apparatus, consistent with embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving clock synchronization or tuning, and may involve validation/authentication of messages via which the clock synchronization/tuning is effected. In certain implementations, aspects of the present disclosure have been shown to be beneficial when used in the context of calculating timing information relative to data frames received, such as over a data bus. Such an approach may, for example, facilitate clock tuning for data transmission, based on characteristics of received messages. While not necessarily so limited, various aspects may be appreciated through a discussion of examples using such exemplary contexts.

Aspects of the disclosure are directed to tuning an internal clock source, intended for transmission, based on the timing properties of selected received messages. In certain embodiments, these messages are selected based on predefined protocol properties and/or successful authentication of the messages (e.g., based on a shared secret). In this context, trustworthiness of a message or a source of the message can be assessed, providing some assurance that the clock source is tuned properly. Such approaches can be used, for example, in automotive applications such as CAN topologies, CAN transceivers and CAN bus guardians, as well as CAN FD, FlexRay, and LIN. These approaches can also be used in a variety of different types of communications, and in (e.g., low cost) physical layer devices.

A variety of approaches can be used to ensure that received messages are trustworthy. Certain aspects involve selecting messages for use in calculating timing based on the content of the messages. For instance, content can be assessed to ensure that it matches predefined rules, which may be different than a predefined bit pattern, or to ensure that the message passes cryptographic verification using a shared secret (e.g., key).

Aspects of the present disclosure involving tuning clock signal sources for communication. As may be implemented in accordance with one or more method(s) and/or apparatus-based embodiments, trustworthiness of a message or a source of the message is validated, as indicated by data received over a data bus that communicatively couples a plurality of circuits respectively, including an independent clock signal source. Data sent between the circuits can be received by adaptively sampling data that is carried by the data bus. Timing information is calculated relative to data frames of the data received over the data bus, and a clock signal source at one of the circuits is tuned in response to the validating and the calculating.

The timing information may be calculated, for example, based on timing properties of the data received over the data bus, in response to the validating indicating that the data frames are trustworthy. For instance, a clock may be tuned using only those data frames that emanate from a trustworthy source, or that pass a particularly security condition (e.g., include a secret key or other security data).

Validation can be carried out in a variety of manners. In some embodiments, content of the message is compared to predefined protocol properties, information from the message is utilized in calculating the timing information, in response to the comparing. In other implementations, one (or more) of the messages communicated on the data bus is selected based on one or both of content in the messages and a characteristic of one of the circuits that transmitted the message, to ensure validity of the message(s). The timing information is then calculated out using timing information in the selected message(s). In still other implementations, shared authentication data is used to authenticate one (or more) of the received messages, and the timing information is calculated from the authenticated message(s). These approaches can also be utilized together, such as by validating both a message source and content of the message itself.

Certain aspects of the disclosure are directed to a circuit-based apparatus having a first circuit and a plurality of other circuits, a data bus, and logic circuitry that tunes the clock signal source of the first circuit. Each respective circuit includes an independent clock signal source, and may include one or more types of logic circuitry operable to carry out relevant tasks (e.g., logic circuitry, a microprocessor, and/or communications circuitry). The data bus is configured and arranged to communicatively couple the first circuit and each of the plurality of other circuits so that data sent between the circuits can be received by adaptively sampling data that is carried by the data bus. The logic circuitry is configured and arranged with the first circuit to tune the first clock signal source by validating trustworthiness of a message or a message source as indicated by data received over the data bus, calculating timing information relative to data frames of the data received over the data bus, and tuning the first clock signal source in response to the validating and the calculating. As such, the first clock signal source can be tuned to a clock of one of the plurality of other circuits, which is otherwise asynchronous.

The logic circuitry calculates the timing information using one or more of a variety of approaches. In some embodiments, the timing information is calculated based on timing properties of the data received over the data bus, in response to the validating indicating that the data is trustworthy. The timing information may also be calculated using messages transmitted on the data bus between respective ones of the plurality of other circuits, by reviewing content of the messages. For instance, data not necessarily intended for a particular receiver may be used to tune the clock of the particular receiver, which is then used to receive messages from one or more (possibly different) nodes in the network.

The message trustworthiness can be validated in a variety of manners. In some embodiments, the content of the message is compared to predefined protocol properties, and the timing information is calculated from the message in response to the message being validated. Shared authentication data may be used to validate the message, with the timing information being calculated from the message in response to the message being validated. Validation may involve selecting specific messages (e.g., based on content in the messages or a source of the messages), and/or further validating the trustworthiness of one of the selected messages. In some implementations, the logic circuitry requests a timing report from a message source, and assesses the timing report to ensure that timing at the message source has not been altered. This provides validation of the trustworthiness of the message source and messages received therefrom.

In some implementations, events and/or timing characteristics can be logged and stored, for further use in validating messages. One or more nodes may carry out such logging and storage, for use by each node within itself or by other networked nodes. For instance, logic circuitry operating in a receiver may access logged events from a data storage circuit in a transmitter (or transceiver) to validate trustworthiness of messages sent by the transmitter based on the accessed logged events.

The clock signal may be tuned using a variety of approaches. In some embodiments, the clock is synchronized to an independent clock signal source utilized to transmit data received over the data bus. A weighting function may be applied to the calculated timing information, such as to more heavily weight timing derived from recent data.

Various embodiments involve use of a network controller circuit communicatively coupled to one or more circuits via the data bus, and that operates to control at least one of the circuits for communicating on the data bus. The logic circuitry controls operation of the first clock signal source independent from instructions communicated by the network controller circuit. Such a controller circuit may be within a common node that the logic circuitry is implemented with, or with a different node that communicates on the same bus.

As may be implemented in accordance with one or more embodiments, an apparatus includes a receiver circuit configured and arranged to receive data messages, a clock signal generator circuit, and logic circuitry configured and arranged to tune the clock signal generator circuit for synchronization with remote transmitter circuits that transmit the data messages. The tuning is carried out as follows. Trustworthiness of one of the received data messages is assessed, and in response to the assessing indicating that the one of the received data messages is trustworthy, the clock signal generator circuit is tuned based on information in the one of the received data messages. For instance, the logic circuitry may select the one of the received data messages, relative to other ones of the data messages, for assessing trustworthiness based on predetermined criteria. The logic circuitry may further assess validity of respective transmitters that transmit the data messages, and select the one of the received data messages based on the assessed validity of the transmitter from which the one of the received messages is sent.

Various embodiments may be employed with communication networks such as a Controller Area Network (CAN, ISO11898), which is an asynchronous serial communications protocol that allows multiple circuits (e.g., masters and slaves) to communicate without necessarily utilizing a common clock signal. FIG. 1 shows an apparatus 100 as may be implemented in accordance with one such embodiment, in which protocol handling is carried out in a controller (e.g., a CAN controller) in respective nodes 110, 120 and 130, which are coupled for communication on a bus having high (140) and low (142) signal lines coupled by resistive circuitry 144 and 146.

Each node (110/120/130) has a host (111/121/131), controller (112/122/132) and transceiver (113/123/133) as noted. A multitude of such nodes may be coupled for communicating with one another over the bus signal lines 140 and 142. Referring to node 130, the controller 132 (e.g., including logic circuitry) is shown with buffers 134, protocol engine 135 and a clock source 136 that is independent from clock sources used for the other nodes.

The controller 132 operates to assess validity of messages communicated on the bus and/or of a source of the messages, and to tune the clock source 136 based on the assessment. For instance, where node 110 communicates information on the bus in accordance with its own, asynchronous clock source, node 130 may assess validity of the node 110, of the message(s) sent by node 110, or of both the node itself and the messages sent. If the message(s) is/are assessed as being valid, the controller 132 can tune the clock source 136 based on the message(s).

In embodiments in which the apparatus 100 is implemented as CAN system, each CAN transceiver (113/123/133) implements the physical layer for CAN. Each CAN controller (112/122/132) needs a precise clock source (e.g., roughly <0.4% accuracy) to be allowed to transmit on the bus, in accordance with bit time settings. The protocol engines adapt their sampling based on the incoming data. The protocol assures that there are maximum 10 bit times between the falling edges, on which the synchronization works. The transceiver 133 may, for example, perform functions like selective wakeup, inbound and outbound filtering and monitoring.

Figure 2:
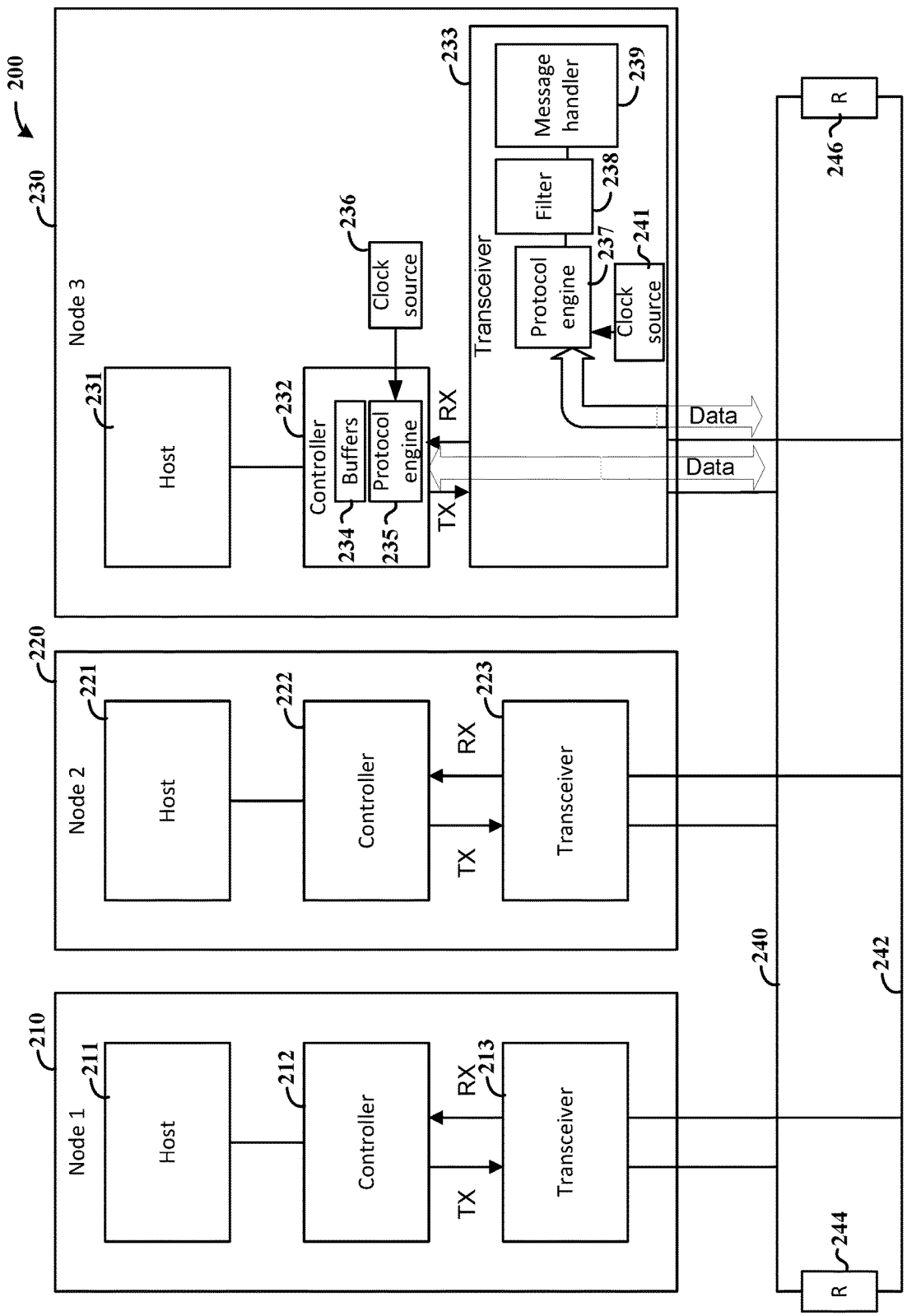
FIG. 2 shows an apparatus with various communication nodes, consistent with embodiments of the present disclosure.

FIG. 2 shows an apparatus 200 with three communication nodes 210, 220 and 230, similar to the apparatus 100. Each node (210/220/230) has a host (211/221/231), controller (212/222/232) and transceiver (213/223/233) as noted. The nodes communicate over a bus having high (240) and low (242) signal lines connected by resistive circuitry 244 and 246). Node 230 is also shown with the controller 232, including buffers 234 and a protocol engine 235, and a clock source 236. The transceiver 233 in apparatus 200 includes additional circuitry, including protocol engine 237, a filter 238, message handler 239 and its own clock source 241. The clock source 241 may be implemented with an on-chip clock source, and the protocol engine 237 in the transceiver 233 may operate to only receive messages.

For configuration, calibration or transmission of log messages, the transceiver 233 constructs and transmits messages without use of an external input for clocking, yet must have its clock source 241 tuned to comply with clock constraints from whatever specification is being utilized for communication. This tuning can be done with synchronization adaptions/errors calculated from receiving frames. In this context, the clock source 241 is tuned based on an assessment of messages received over the bus as characterized herein, such as to affirm the validity of the messages, the source of the messages, or both.

Figure 3:
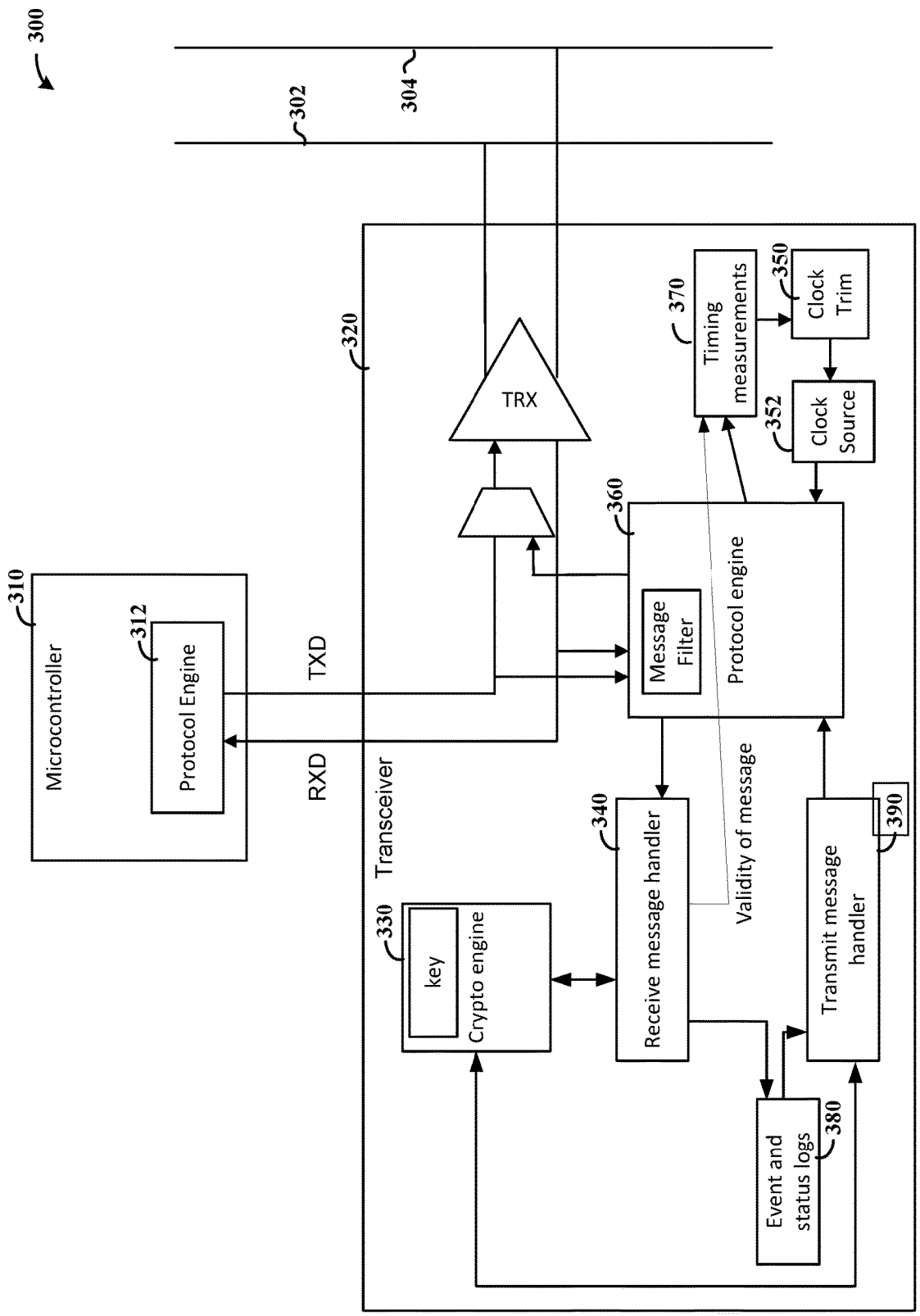
FIG. 3 shows a transceiver apparatus, consistent with embodiments of the present disclosure.

FIG. 3 shows an apparatus 300, as may be implemented in connection with one or more embodiments. The apparatus 300 includes a microcontroller 310 having a communications protocol engine 312, and a transceiver 320 that communicates on a bus having high (302) and low (304) lines. The transceiver includes a cryptographic engine 330 (e.g., storing a key), a receive message handler 340, a clock trim circuit 350 that trims a tunable clock source 352, a communications protocol engine 360, storage for timing measurements 370 and event and status logs 380, and a transmit message handler 390.

The protocol engine 360 is used for the reception and transmission of the frames, using the tunable clock source 352. The receive message handler 340 receives validates messages (optionally with a cryptographic function at 330). A message filter in the protocol engine may filter messages based on ID therein. The protocol engine 360 stores relevant timing measurements at 370 and the receive message handler 340 stores logging information at 380. The transmit message handler 390 can use the stored information to construct logging or response messages that are transmitted by the protocol engine 360. The transmit message handler 390 can also optionally use the cryptographic function to add encryption or authentication to the constructed message. Accordingly, the receive message handler 340 can ensure that the clock source 352 is properly tuned in accordance with messages received on the bus, by assessing validity of the messages.

Figure 4:
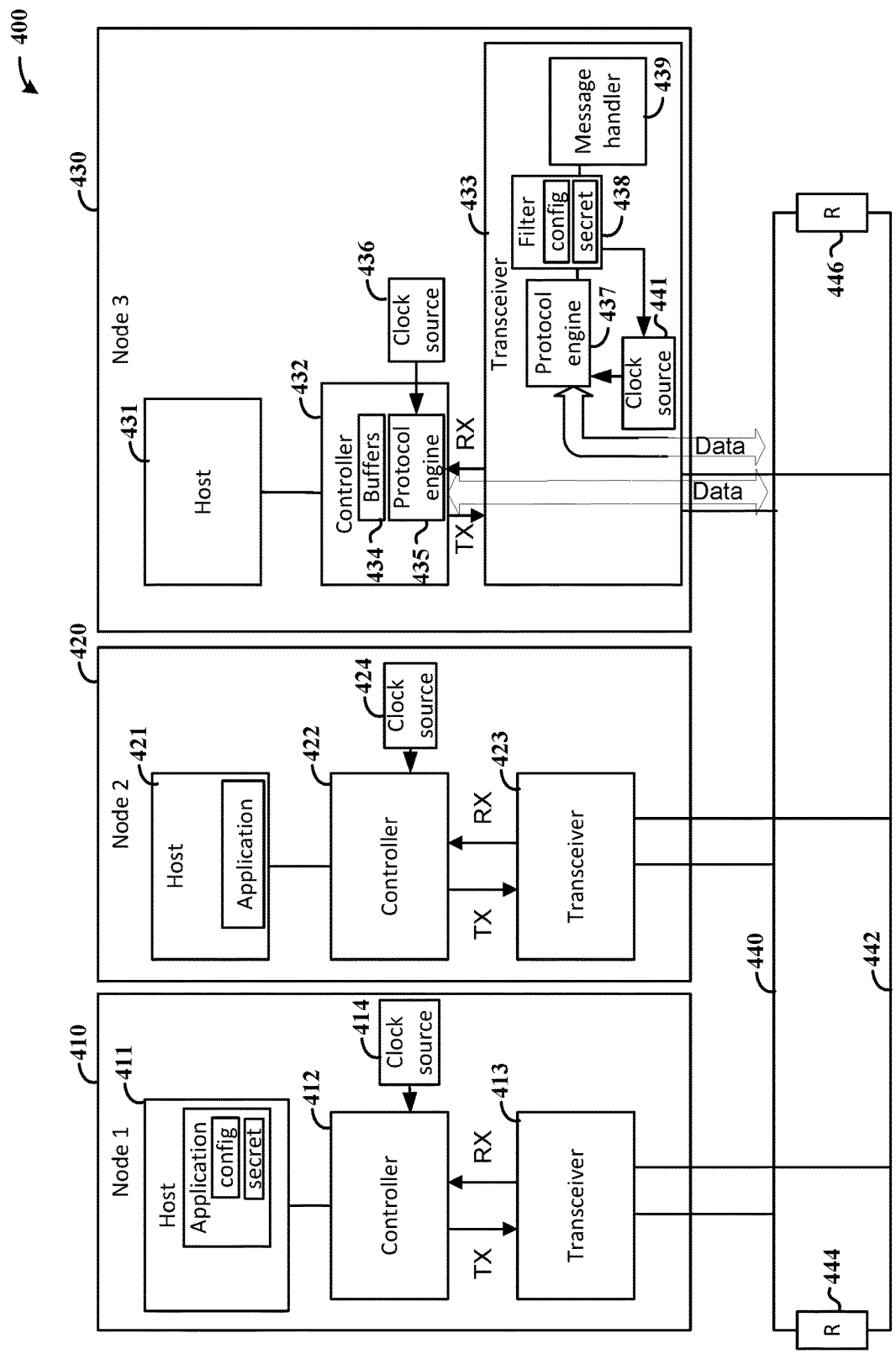
FIG. 4 shows an apparatus with various communication nodes, consistent with embodiments of the present disclosure.

FIG. 4 shows an apparatus 400, as may be implemented with one or more embodiments. The apparatus 400 includes three communication nodes 410, 420 and 430 respectively having a host (411/421/431), controller (412/422/432) and transceiver (413/423/433) as noted. Each controller has a clock source (414/424/436), with controller 432 shown with buffers 434 and protocol engine 435. The transceiver 433 includes a protocol engine 437, filter 438, message handler 439 and clock source 441.

In various implementations, the transceiver 433 is implemented utilizing components of FIG. 3. The transceiver 433 thus may effect protocol conformance checking or inbound/outbound filtering or security monitoring. Event report logging can be utilized in verifying the authentication of messages (e.g., via verification of nodes sending the messages). The messages from the transceiver 433 are transmitted based on messages on the bus other nodes prior to the transmission of its own message. These messages can be regular messages from or dedicated request messages intended for the transceiver 433. The transceiver 433 measures timing properties of each message and validates the message based upon the source and/or message content and/or by checking if the message is authentic, for example, based upon a shared secret with cryptographic functions. If the message is proven to be trustworthy, the message timing properties are used for tuning the clock source 441.

As a use-case example, where clock source 424 of node 420 has a low safety classification and clock source 414 of node 410 has a high safety classification, the transceiver 433 can use messages only from node 410 for tuning of the clock source 441 (e.g., tuning an on-chip oscillator). The tuning can be done based upon a single or multiple frame(s) received from the node 410. A weighting function can be used, for example, based on the age of the measurement, the length of a message, or other criteria. Other security measures can also be taken, such as by authenticating frames using encryption.

In some embodiments, the transceiver 433 accesses log information at node 410, and verifies that the node 410 has not been compromised based on the access. In other embodiments, node 410 requests a report from node 430, in response to which the transceiver 433 assesses the validity of the request. If the request is authentic, for instance based upon a verification of a shared secret, the transceiver provides the report (e.g., using event logging and/or timing measurements as noted in FIG. 3). This approach may also be used, for example, to mitigate or prevent node 430 from being tuned based on incorrect timing, for instance if timing from node 420 is compromised after the node has been hacked for sending messages with timing properties that are not within specification.

Accordingly, various aspects are directed to utilizing selectivity of messages on which an internal clock reference is tuned, with optional use of a shared secret and cryptographic functions to ensure the clock tuning is robust to hacks in the physical domain. The timing behavior of other nodes in a network can be verified and reported upon. Implementation of these functions in a smart transceiver can isolate and protect the function from hacks in an attached host. For instance if the software of a host within node 430 is hacked, the host is not able to disable security functions in the transceiver 433, as it does not have knowledge or physical access to the shared secret and/or configuration of the transceiver's functionality.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., host, controller, protocol engine, clock source, or transceiver). For example, in certain of the above-discussed embodiments, one or more modules are discrete logic circuits or programmable logic circuits configured and arranged for implementing these operations/activities, as in the circuit modules shown in FIGS. 1-4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, different types of validation may be carried out using different types of encryption, keys, and verification thereof. In addition, while various examples characterize the use of automotive applications, aspects herein can be utilized in a variety of different types of communications systems and methods. Such modifications do not depart from the true spirit and scope of various aspects of the invention, including aspects set forth in the claims.

What is claimed is:

1. A circuit based apparatus comprising:
a first circuit including a first clock signal source;
a plurality of other circuits, each including an independent clock signal source that is asynchronous relative to the first clock signal source;
a data bus configured and arranged to communicatively couple the first circuit and each of the plurality of other circuits so that data sent between the circuits can be received by adaptively sampling data that is carried by the data bus; and
logic circuitry configured and arranged with the first circuit to tune the first clock signal source by:
validating trustworthiness of a message or a message source as indicated by data received over the data bus;
calculating timing information relative to data frames of the data received over the data bus; and
tuning the first clock signal source in response to the validating and the calculating.

2. The apparatus of claim 1, wherein the logic circuitry is configured and arranged to calculate the timing information based on timing properties of the data received over the data bus, in response to the validating indicating that the data is trustworthy.

3. The apparatus of claim 1, wherein the logic circuitry is configured and arranged to validate the trustworthiness of the message by comparing content of the message to predefined protocol properties, and to calculate the timing information from the message in response to the message being validated.

4. The apparatus of claim 1, wherein the logic circuitry is configured and arranged to validate the trustworthiness of the message using shared authentication data, and to calculate the timing information from the message in response to the message being validated.

5. The apparatus of claim 1, wherein the logic circuitry is configured and arranged to select messages communicated on the data bus based on content in the messages, and to carry out the step of validating by validating the trustworthiness of one of the selected messages.

6. The apparatus of claim 1, wherein the logic circuitry is configured and arranged to tune the first clock signal by synchronizing the first clock to one of the independent clock signal sources utilized to transmit the data received over the data bus.

7. The apparatus of claim 1, wherein the logic circuitry is configured and arranged to select messages for validating based on a source of the messages.

8. The apparatus of claim 1, wherein the logic circuitry is configured and arranged to calculate the timing information using messages transmitted on the data bus between respective ones of the plurality of other circuits, by reviewing content of the messages.

9. The apparatus of claim 1, wherein the logic circuitry is configured and arranged to tune the first clock signal source by applying a weighting function to the calculated timing information.

10. The apparatus of claim 1, wherein the logic circuitry is configured and arranged to validate the trustworthiness of the message source by:
    requesting a timing report from the message source, and
    assessing the timing report to ensure that timing at the message source has not been altered.

11. The apparatus of claim 1, wherein
    the first circuit is a receiver;
    one of the plurality of other circuits is a transceiver having a data storage circuit, and is configured and arranged to log events and to store the logged events in the data storage circuit; and
    the logic circuitry is in the receiver and configured and arranged to access the logged events from the data storage circuit in the transceiver, and to validate trustworthiness of messages sent by the transceiver based on the accessed logged events.

12. The apparatus of claim 1,
    further including a network controller circuit communicatively coupled to the plurality of other circuits via the data bus and configured and arranged to control at least one of the plurality of other circuits for communicating on the data bus, and
    wherein the logic circuitry is configured and arranged to control operation of the first clock signal source, independently from instructions communicated by the network controller circuit.

13. An apparatus comprising:
    a receiver circuit configured and arranged to receive data messages;
    a clock signal generator circuit; and
    logic circuitry configured and arranged to tune the clock signal generator circuit for synchronization with remote transmitter circuits that transmit the data messages in accordance with one or more different clock signal sources, by:
        assessing trustworthiness of the received data messages; and
        in response to the assessing indicating that one of the received data messages is trustworthy and checking validity of a remote transmitter circuit that transmitted the one of the received data messages based on an event log, tuning the clock signal generator circuit based on information in the one of the received data messages.

14. The apparatus of claim 13, wherein the logic circuitry is configured and arranged to select the one of the received data messages, relative to other ones of the data messages, for assessing trustworthiness based on a safety classification of the remote transmitter circuits that transmitted the received data messages predetermined criteria.

15. A method comprising:
    validating trustworthiness of a message or a message source as indicated by data received over a data bus that communicatively couples a plurality of circuits, each including an independent clock signal source, so that data sent between the circuits can be received by adaptively sampling data that is carried by the data bus;
    calculating timing information relative to data frames of the data received over the data bus; and
    tuning a first clock signal source, at a first one of the plurality of circuits, in response to the validating and the calculating.

16. The method of claim 15, wherein the step of calculating the timing information is carried out based on timing properties of the data received over the data bus and in response to the validating indicating that the data frames are trustworthy.

17. The method of claim 15, wherein the step of validating includes comparing content of the message to predefined protocol properties, and the step of calculating includes using information from the message in response to the comparing.

18. The method of claim 15, wherein:
    the step of validating includes selecting one of the messages communicated on the data bus based on one or both of content in the messages and a characteristic of one of the circuits that transmitted the message; and
    the step of calculating timing information is carried out using timing information in the selected one of the messages.

19. The method of claim 15, wherein:
    the step of validating includes using shared authentication data to authenticate one of the received messages; and
    the step of calculating includes calculating the timing information from the authenticated one of the received messages.

* * * * *